(12) United States Patent
Christiansen et al.

(10) Patent No.: US 10,126,962 B2
(45) Date of Patent: Nov. 13, 2018

(54) ADAPTED BLOCK TRANSLATION TABLE (BTT)

(71) Applicant: Microsoft Technology Licensing, LLC, Redmond, WA (US)

(72) Inventors: Neal R. Christiansen, Bellevue, WA (US); Chandra Kumar Konamki Vijayamuneeswaralu, Sammamish, WA (US); Scott Chao-Chueh Lee, Bellevue, WA (US); Atul P. Talesara, Redmond, WA (US); Pedro d'Aquino Filocre FS Barbuda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/290,896

(22) Filed: Oct. 11, 2016

(65) Prior Publication Data

US 2017/0315742 A1 Nov. 2, 2017

Related U.S. Application Data

(60) Provisional application No. 62/326,547, filed on Apr. 22, 2016.

(51) Int. Cl.
*G06F 3/06* (2006.01)
*G06F 12/1027* (2016.01)
(Continued)

(52) U.S. Cl.
CPC ............ *G06F 3/0619* (2013.01); *G06F 3/065* (2013.01); *G06F 3/067* (2013.01);
(Continued)

(58) Field of Classification Search
CPC ........ G06F 3/0619; G06F 3/065; G06F 3/067; G06F 12/0246; G06F 12/1027; G06F 12/109; G06F 13/28; G06F 2212/7201
See application file for complete search history.

(56) References Cited

U.S. PATENT DOCUMENTS 5,404,485 A 4/1995 Ban
8,275,946 B1 9/2012 Smith
(Continued)

FOREIGN PATENT DOCUMENTS

WO 2006132939 A2 12/2006
WO 2015198009 A1 12/2015

OTHER PUBLICATIONS

"International Search Report and Written Opinion Issued in PCT Application No. PCT/US2017/027851", dated Aug. 23, 2017, 11 Pages.
(Continued)

*Primary Examiner* — Eric Cardwell
(74) *Attorney, Agent, or Firm* — Newport IP, LLC; Han Gim

(57) ABSTRACT

Techniques are described for performing a memory operation where direct memory access and logical address translation are implemented. A request for an I/O operation received that includes information indicative of whether a physical memory address may be changed and whether sector atomicity is desired. Based on the information, the requested I/O operation is performed using unmodified Block Translation Table (BTT) where the physical location associated with the requested I/O operation is changed and sector atomicity is provided, or modified BTT where a physical location associated with the requested I/O operation is not changed, or modified BTT where a physical location associated with the requested I/O operation is not changed and atomicity is provided.

22 Claims, 5 Drawing Sheets

(51) Int. Cl.
*G06F 12/109* (2016.01)
*G06F 12/02* (2006.01)
*G06F 13/28* (2006.01)

(52) U.S. Cl.
CPC ........ *G06F 12/0246* (2013.01); *G06F 12/109* (2013.01); *G06F 12/1027* (2013.01); *G06F 13/28* (2013.01); *G06F 2212/7201* (2013.01)

(56) References Cited

U.S. PATENT DOCUMENTS

| | | | |
|---|---|---|---|
| 8,478,799 B2 | 7/2013 | Beaverson et al. | |
| 9,146,683 B2 | 9/2015 | Wei et al. | |
| 9,218,279 B2 | 12/2015 | Tomlin et al. | |
| 2005/0005039 A1* | 1/2005 | Saito | G06F 13/385 710/52 |
| 2008/0228992 A1 | 9/2008 | Dumitru et al. | |
| 2010/0030999 A1 | 2/2010 | Hinz | |
| 2013/0191609 A1 | 7/2013 | Kunimatsu et al. | |
| 2014/0281145 A1* | 9/2014 | Tomlin | G06F 12/0246 711/103 |
| 2014/0281159 A1 | 9/2014 | Saito et al. | |
| 2015/0212937 A1 | 7/2015 | Stephens | |

OTHER PUBLICATIONS

"NVDIMM Namespace Specification", Published on: Apr. 2015 Available at: http://pmem.io/documents/NVDIMM_Namespace_Spec.pdf.

"NVDIMM Block Window Driver Writer's Guide", Published on: Apr. 2015 Available at: http://pmem.io/documents/NVDIMM_Driver_Writers_Guide.pdf.

Verma, Vishal., "Using the Block Translation Table for sector atomicity", Published on: Sep. 23, 2014 Available at: http://pmem.io/2014/09/23/btt.html.

Kale, et al., "An Innovative Algorithm for Flash memory", In International Journal of Computer Science and Information Technologies, vol. 3, Issue 3, May 2012, pp. 4371-4376.

* cited by examiner

ADAPTED BLOCK TRANSLATION TABLE (BTT)

BACKGROUND

Storage-class memory (SCM) is a type of persistent memory that combines characteristics of a solid-state memory with those of conventional hard-disk magnetic storage. SCM can perform input/output (I/O) at byte granularity. Block device drivers may be used to expose such storage as traditional block devices. However, sector atomicity guarantees may also be desired to provide protection against torn sectors and other issues that may result from power failures when a write operation is in progress. The Block Translation Table (BTT) provides atomic sector update semantics for SCM. The BTT is an indirection table that re-maps the blocks on a given storage device.

SUMMARY

Disclosed herein are methods and systems for facilitating operation of a plurality of computing devices. Embodiments may include receiving a request for an I/O operation. The request may include information indicative of whether a physical block address may be changed and whether sector atomicity is desired. Based on the information, the requested I/O operation may be performed using (1) unmodified Block Translation Table (BTT) where the physical location associated with the requested I/O operation is changed and sector atomicity is provided; (2) modified BTT where the physical location associated with the requested I/O operation is not changed; or (3) modified BTT where the physical location associated with the requested I/O operation is not changed and atomicity is provided.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
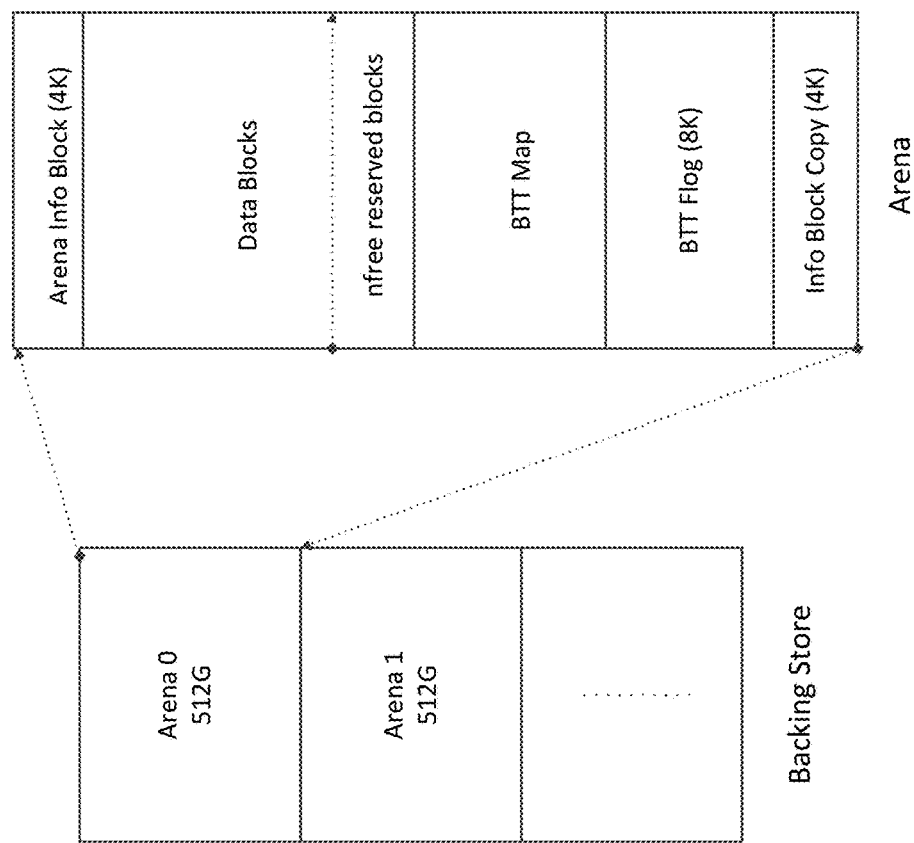
FIG. 1 depicts an example of a BTT scheme.

When a persistent memory storage such as SCM is implemented in a system, it is desirable to provide block-level I/O while providing atomicity guarantees. The BTT (block translation table) is one such method. A BTT establishes a mapping between logical block addresses (LBA) that are seen by the rest of the system and physical block addresses (PBA) that specify where the block is actually stored on the physical media. In the case of persistent memory storage, a PBA is used to indicate the physical memory address of the block's contents. When unmodified BTT is enabled, a write operation to a given LBA is first performed to a free block that is not in use. The PBA corresponding to the LBA is then atomically swapped in the BTT map. That is, the map entry associated with the LBA is atomically changed to point to the PBA of the free block that was written to. Because the map update is atomic, the system either sees the old contents of the block (i.e. the old PBA) or the new contents of the block (i.e. the new PBA), and never sees a partially written block.

When implementing methods such as BTT in a given environment, in order to provide a more secure and more efficient operation, the following may be considered: (1) support of direct access (DAX) to persistent memory (also known as zero-copy access); (2) allowing existing user-mode applications to run without modification; and (3) allowing for sector granular failure modes for application compatibility.

The present disclosure describes techniques for modifying or augmenting methods such as BTT to provide greater compatibility and functionality with various operational environments. In one embodiment, a "per write BTT" scheme may be implemented. In some environments, it is desirable to identify, on a per-write operation, as to whether to allow the PBA of the LBA being written to be changed. For example, in a direct access environment, it may not be desirable to always perform PBA updates because physical memory addresses are being used by other components of the system, while for some file system metadata it may be desirable to perform PBA updates to guarantee sector atomicity. Thus the ability to control the implementation of BTT on a per write basis may provide this flexibility.

In some embodiments, an "in-place BTT" capability may be provided. During a write operation, the BTT translation table may be traversed in order to find the PBA but the atomic write is not performed. Instead, the data is copied directly to the physical memory address that corresponds to the existing PBA. For example, a system may provide in-place BTT support on a given write operation when a BTT PBA update is not desired because the physical address corresponding to the LBA being written is in use by a different component.

In some embodiments, a "copy BTT support" capability may be provided, where existing BTT structures and process are implemented and atomicity guarantees are provided but the PBA of a block is not changed. When copy BTT support is provided, during a write operation a free block is identified and data is copied to it as is done for unmodified BTT. Instead of making the free block the new PBA, the data is written again to the physical memory address associated with the current PBA. The data is thus written twice, once to the free page, and then to the current PBA. In the event of a power outage during the existing PBA copy, the copying of the data to the existing PBA can be re-attempted to provide atomicity guarantees. This is possible because logs are created that indicate that the copy to the existing PBA was interrupted and the data written to the new PBA was persisted.

In some embodiments, a per file BTT scheme may be implemented, where a file can be marked at open time or a later time, indicating that I/O operations should use one of the BTT modes discussed above.

Although the following examples are provided in the context of SCM and modification of a BTT implementation, the described techniques can be applied in any technique involving the remapping of logical and physical addresses during I/O operations. As used herein, "unmodified BTT" is used to refer to BTT techniques that have not been adapted or modified as described herein. Furthermore, the techniques described herein may be implemented in scenarios where the OS is running on virtualized hardware. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system.

As used herein, "storage stack" refers to an entity that may include a layering of various drivers, filters, encryption logic, antivirus logic, etc. that may be used to handle transfers/transformation of data/information from main memory to other storage. For example, for I/O requests (e.g., "read/write" requests), a block of data may be "packaged" (e.g., using a construct such as an IRP (I/O Request Packet)) and passed down the stack; thus, entities in the stack handle the transfer of that data from main memory to storage. Generally, such "I/O" operations (e.g., "read/write" operations) involve more processing time (and hence, more delay time) than traditional "load/store" operations that may occur directly between a CPU and main memory (e.g., with no "storage stack" involvement in such operations).

The term "file system" is used by way of example and the discussion of example techniques herein may also be applied to other types of file systems. In this context, a "file system" may include one or more hardware and/or software components that organize data that is persisted. For example, persisted data may be organized in units that may be referred to as "files"—and thus, a "file system" may be used to organize and otherwise manage and/or control such persisted data. For example, a "file" may be associated with a corresponding file name, file length, and file attributes. A file handle may include an indicator (e.g., a number) used by the file system to uniquely reference a particular active file.

A "cache" may refer to an entity that is used to store items for efficient retrieval. More generally, in computing, a cache is a component that transparently stores data so that future requests for that data can be served faster. For example, the data that is stored within a cache may be values that have been computed earlier or duplicates of original values that are stored elsewhere. If requested data is stored in the cache, the request can be served by simply accessing (e.g., reading) the cache, which may be comparatively faster. Otherwise, the data may need to be recomputed or fetched from its original storage location, which may be comparatively slower. Hence, the greater the number of requests that can be served from a cache, the faster the overall system performance may become, generally. For example, cache may be physically located in RAM. For example, cache may also be located in persistent storage.

Various embodiments may support a "direct access" storage model that can enable an application to have direct access to persistent memory storage so that it may be modified without a need to issue read/write operations through the storage stack. In some examples, a memory-mapped file implementation may include modifications to provide direct access to persistent memory. In this context, "byte" refers to a smallest unit of addressable memory that is accessible by a device processor. For example, a byte may typically have a size of eight bits (binary digits), although one skilled in the art of computing will appreciate that other sizes for "bytes" may also be used in various hardware (and/or software) configurations.

In some embodiments, a file system volume (or "storage system" volume) may be implemented that, on persistent memory (or byte-addressable storage) devices, behaves differently from conventional volumes for memory mapped, cached, and non-cached I/Os (input/output operations). This different behavior may provide significantly faster access times to the volume (e.g., via reduced latency and increased throughput). For example, the faster access times may be realized as a result of by-passing most of the file-system and all of the storage stack when memory mapped or cached I/O is being processed. For example, instead of stepping through these stacks, access to the device (e.g., application-level access to the device) may be provided directly on the memory bus (i.e., via "direct access") by reading from or writing to byte-addressable ranges that are exposed via the file system. In some embodiments, the kernel's memory manager and cache manager are involved in creating mapping table entries to enable the file system to make this direct access storage available to applications. For example, non-cached I/O may be converted to cached I/O, so that the I/O may, at least, avoid traversal of the storage stack.

In some embodiments, persistent, byte addressable storage may be exposed to the file system as a storage device (i.e., not as memory). Software at various levels from applications, operating systems and file system may be allowed to consume and optimize for persistent memory. A file system may be optimized based on underlying storage capabilities. For example, a file system that optimizes for persistent memory may advantageously provide "zero copy" storage (i.e., requiring only a "main" or "original" version, and no "copies" in addition to the "main" version).

In various embodiments, the kernel (e.g., via memory manager, cache manager) may be allowed to expose byte-addressable ranges to the file system. A "memory-mapped file" may refer to a segment of virtual memory that has been assigned a direct byte-for-byte correlation with some portion of a file.

As used herein, reference may be made to various computer system entities, including a memory manager (MM) and a cache manager (CC). Direct Access Storage or Direct Access (DAX) may refer to a mode of operation where a file system provides a way for applications to directly access the persistent memory via the memory bus. Storage Class Memory (SCM) may refer to persistent, byte addressable storage that is accessible via the memory bus. SCM may refer to technologies that may include double data rate type 4 (DDR4) Non-Volatile dual in-line memory module (DIMM) (NVDIMM-N). One skilled in the art of computing will appreciate that other terms may also refer to such storage. For example, BAS may refer to "Byte Addressable Storage," NVM to "Non-Volatile Memory," and PM to "Persistent Memory" may also refer to such storage.

The described techniques may enable operating systems (e.g., MICROSOFT WINDOWS) to take advantage of this technology. Any memory-bus accessible persistent storage technology may be usable with example techniques discussed herein. For example, the MICROSOFT New Technology File System (NTFS) and/or the MICROSOFT Resilient File System (ReFS) may use such techniques. When a DAX capable device is detected (e.g., at mount time), Direct Access storage (DAX-Mode) may be implemented via implicit mode or explicit mode. For example, in implicit mode, the entire volume is implicitly in DAX-Mode and all mapped sections may be mapped in DAX-Mode unless the file system instructs the MM to not perform such a mapping. In explicit mode, the volume is DAX-Mode capable but an application explicitly requests that the system create a given mapped section in DAX-Mode.

"Section" may refer to a region of memory. For example, the region of memory may be a logically contiguous range (e.g., not necessarily physically contiguous storage). For example, a portion of a file may be mapped to RAM, and a section may be an in-memory representation of the file. Multiple applications may create respective multiple sections for a same (common) file. Virtual addresses in each respective application may be different (as virtual addresses), but may translate to the same (common) physical address of the referenced data within the common file. Using an SCM driver, a volume may be created which behaves like any other storage device volume with I/O operations flowing through the file system and storage stacks. A "volume" or logical drive may refer to a single accessible storage area with a single file system, typically (though not necessarily) resident on a single partition of a hard disk. Although a volume may be different from a physical disk drive, it may still be accessed with an operating system's logical interface. For example, in some systems, volumes may be handled by a volume manager or by the kernel.

Figure 2:
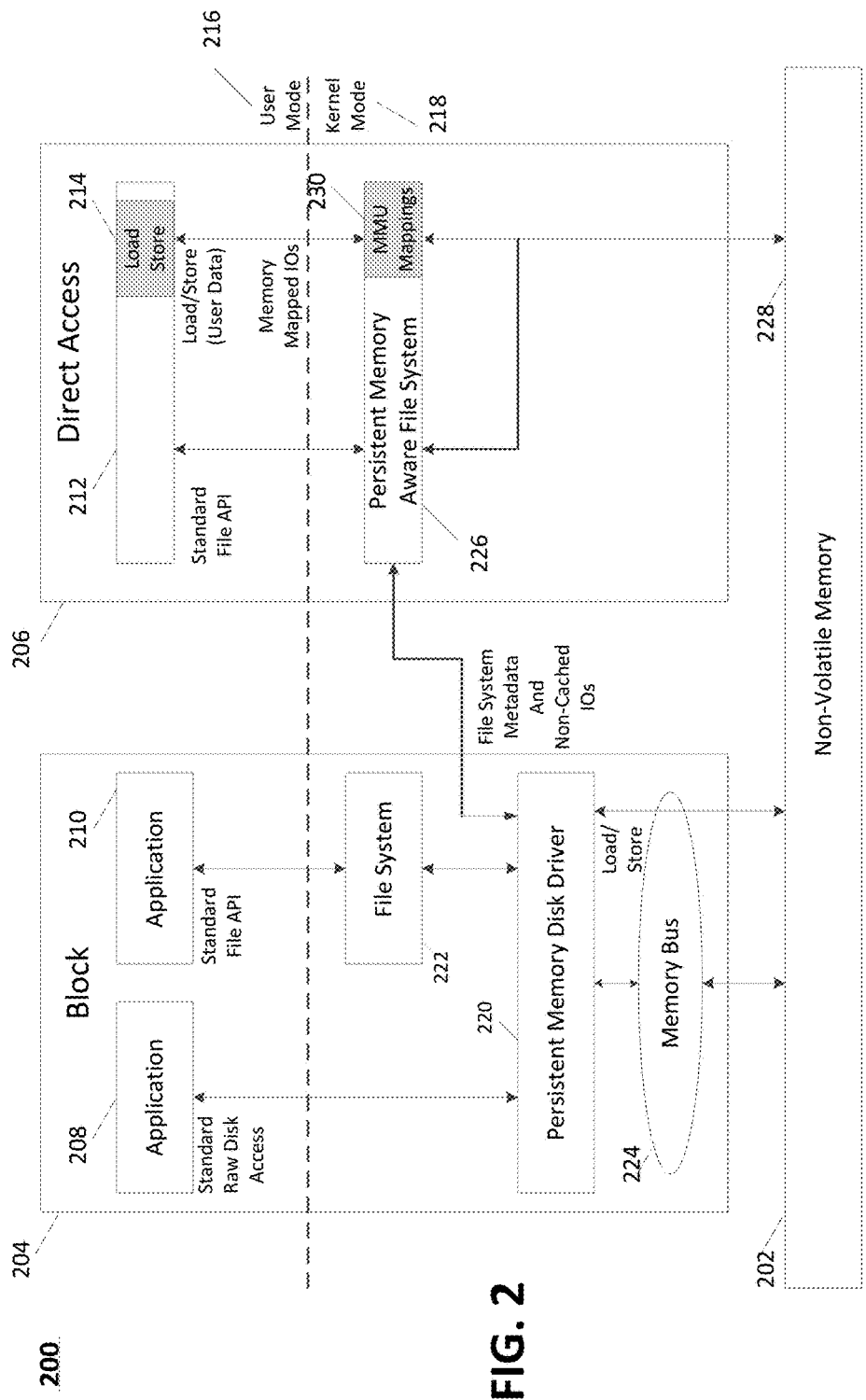
FIG. 2 depicts an example of block access to a persistent memory, and example direct access to the persistent memory.

FIG. 2 is a block diagram 200 illustrating example block access to a non-volatile memory, and example direct access to the persistent memory. As shown in FIG. 2, a persistent memory 202 may be accessed via block access 204, as well as direct access 206. The persistent memory 202 may be coupled to a memory bus of a computing device. Applications 208, 210 access the persistent memory 202 using block access 204, while application 212 accesses the persistent memory 202 using direct access 206. The application 212 may access the persistent memory 202 via a standard file application programming interface (API), or via a load/store 214 operation, (e.g., via memory-mapped I/Os). As shown in FIG. 2, the applications 208, 210, 212 operate in user mode 216, while other entities (as shown in the lower portions of the block access 204 and direct access 206 diagram blocks of FIG. 2) operate in kernel mode 218 (as shown).

As shown in FIG. 2, the application 208, for block access 204, may utilize standard raw disk access to the persistent memory 202 via a persistent memory disk driver 220. The application 210 may utilize a standard file API to obtain access to the persistent memory 202 via a file system 222, which accesses the persistent memory 202 via the persistent memory disk driver 220. The persistent memory disk driver 220 utilizes a memory bus 224 to access the persistent memory 202.

As shown in FIG. 2, the application 212, for direct access 206, may utilize a standard file API to access the persistent memory 202 via a persistent memory aware file system 226. As shown in FIG. 2, the persistent memory aware file system 226 may access the persistent memory 202, for file system metadata, via the persistent memory disk driver 220, using load/store operations. Further, the persistent memory aware file system 226 may also access the persistent memory 202 via cached I/O operations (with a load/store portion 228 of the persistent memory 202). As shown in FIG. 2, the application 212 may utilize load/store 214 operations for user data, (e.g., via memory-mapped I/Os), via load/store 214 operation, (e.g., via memory-mapped I/Os), via memory management unit (MMU) mappings 230, to access the load/store portion 228 of the persistent memory 202.

Byte-addressable storage class memory may provide two ways of accessing the data. One way is as physical memory, which may be referred to as direct memory access, direct access, or DAX. This is the access method that may be natively supported by the device. In this method the device has no concept of a sector (or a block) and hence no sector atomicity. Another way is the conventional block I/O mode, which may be implemented by the disk driver. Because the native support does not provide sector atomicity, the disk driver may implement sector atomicity in software.

As discussed above, the Block Translation Table (BTT) is a way to provide atomic sector update semantics for SCM devices. The BTT may be implemented as a lookup/indirection table that maps an external Logical Block Address (LBA) to an internal Physical Block Address (PBA). External components such as the file system typically only see the LBA. This may also be referred to as external LBA and can generally be referred to as the premap LBA if arenas are abstracted out. The Physical Block Address (PBA) is the true physical block address and is seen only by the disk driver. The PBA may also be referred to as the postmap LBA. In general, the number of PBAs is greater than the number of LBAs. The Arena is a 512 GB block, where in the BTT scheme, the disk is divided into multiple arenas. Each arena has the key BTT structures further discussed below to perform the translation. FIG. 1 illustrates one example of a BTT implementation.

The key BTT structures include:
1. A table that maps each LBA to a PBA, which may be referred to as the mapping function BTT(x).
2. A pool of reserved physical blocks. The number of such blocks determine the number of concurrent writes that can be supported. This number may be referred to as nfree.
3. A free list log which has nfree records. Each record has two copies. A sequence number is used to find the latest free record. Whenever the log is updated, the old copy is written to and the sequence number is updated to identify it as the new copy. A log record stores {LBA, PBAToFree, PBAToUse}. The log is used to:
   a. Identify the free physical blocks on boot. In this way a process can avoid reading the entire BTT Map to identify the free physical blocks on each boot.
   b. Update the BTT Map with NewPBA, i.e., BTT (LBA) F NewPBA in the event that the machine crashed (or suffered a power loss) after the log record is persisted but before the update to the BTT table can be persisted.
4. A read tracking table (RTT) (not shown) which tracks physical blocks that are being read by a thread. This ensures that a free block is not written to if the thread is still reading from the block.

In one embodiment, the sequence of operations for a write operation may be as shown below. When a block (in this example, LBA-15), is not direct mapped, the unmodified block write may be performed with the following steps:
1. Acquire an exclusive access to the log record, look up the free PBA (NewPBA in this example)
2. Write to NewPBA
3. OldPBA←BTT(LBA-15);
4. Update the free block list log with the {LBA-15, OldPBA, NewPBA}

5. Ensure data is persisted to the persistent memory
6. Update the sequence number in the above free block list log record
7. Ensure data is persisted to the persistent memory. After this operation, this log entry indicates that OldPBA is free, which is acceptable since it is not yet released.
8. Update BTT(LBA-15)←NewPBA
9. Ensure data is persisted to the persistent memory
10. Release the access to the log record.

This remapping changes the physical address corresponding to the block. This process may be avoided in situations where the file's content is accessed using the physical address. The process may read stale data or write to an old physical block which may result in corrupted or lost data. For example, the physical block OldPBA may have been allocated to some other LBA in which case the process may corrupt the block.

With reference to the above steps, the following indicates actions which may be taken, in some embodiments, in response to a system crash or other such event:
1. No persistent change, thus no response is needed.
2. Data was written to a free block—even if only a partial write was performed, this is a don't care, thus no response is needed.
3. No new persistent change, thus no response is needed.
4. This update of the log record need not be considered because the sequence number is not new, so a partial update is not a concern.
5. This update of the log record need not be considered because the sequence number is not new, so a partial update is not a concern.
6. If the sequence number update has not been persisted, then this is not a concern.
7. This update (or copy) of the log record is processed as follows:
   a. If BTT(LBA)=OldPBA then write BTT(LBA) F NewPBA
   b. OldPBA is considered free
   If there is a crash after this step, BTT(LBA-15) will be OldPBA, and the update can be processed upon recovery
8. Recover—Step 7 will update the BTT table upon recovery.
9. Since the BTT map entry is persisted, no further recovery steps are required.
10. The BTT update to use the NewPBA, i.e., freeing the OldPBA, has been persisted. It is therefore safe to release OldPBA as free to other threads, i.e., it is safe to release the exclusive access to the log record.

In one embodiment, the sequence of operations for a Copy BTT (CBTT) operation may be as shown below. CBTT may be used when a block is being read or written with direct mapping because the physical address of a block doesn't change. The key structures of the BTT scheme may continue to be used. In the following example, a block write to LBA-15 may be implemented as follows:
1. Acquire an exclusive access to the log record and look up the free PBA (this is referred to in this example as NewPBA).
2. Write to NewPBA.
3. OldPBA←BTT(LBA-15).
4. Update the free block list log with the {LBA-15, OldPBA, NewPBA}.
5. Ensure data is persisted to the persistent memory
6. Update the sequence number in the above free block list log record
7. Ensure data is persisted to the persistent memory
8. Write to OldPBA.
9. Update the same record, but to a different copy of the free block list log with the {LBA-15, NewPBA, OldPBA}. The same record is updated because a PBA should not be indicated as free in one record and used in another record. It should be noted that the number of log records is equal to the number of free physical blocks. In one embodiment, the free block list log is not a strict append only log. The log entry may be exclusively accessed until the write operation is completed. New versions may therefore be written to the log.
10. Ensure data is persisted to the persistent memory
11. Update the sequence number in the above free block list log record.
12. Ensure data is persisted to the persistent memory Using the above operations, the physical address that corresponds to a block will not be changed.

With reference to the above steps of the CBTT, the following recovery steps describe actions which may be taken, in some embodiments, in response to a system crash or other such event:
1. No persistent change, thus no response is needed.
2. Data was written to a free block—even if only a partial write was performed, this is a don't care, thus no response is needed.
3. No new persistent change, thus no response is needed.
4. This update of the log record need not be considered because the sequence number is not new, so a partial update is not a concern.
5. This update of the log record need not be considered because the sequence number is not new, so a partial update is not a concern.
6. If the sequence number update has not been persisted, then this is not a concern. Otherwise, perform the same as in Recovery-Step 7 below.
7. If the sequence number update has not been persisted, then this is not a concern. Otherwise, this update (or copy) of the log record becomes the latest and processed as follows:
   a. If BTT(LBA)=OldPBA, then copy the contents of NewPBA to OldPBA
   b. NewPBA still remains free
   In some embodiments, the following alternative approach may be implemented which may provide better performance but may fragment the disk:
   a. If BTT(LBA)=OldPBA then BTT(LBA) F NewPBA
   b. OldPBA is considered free
   If a crash or other event after this step, BTT(LBA-15) will be OldPBA and this can be updated upon recovery.
8. Recovery-Step 7 described above will either update the contents of the OldPBA or update the BTT table on recovery, and therefore there are no concerns about a torn write to OldPBA
9. This update (or copy) is not considered because the sequence number has not been persisted.
10. This update (or copy) is not considered because the sequence number has not been persisted.
11. Same as above if sequence number update has not been persisted. If sequence number update is persisted, this is same as recovery step 12, below.
12. If the sequence number update has not persisted, then Recovery-Step 7 will have performed necessary steps. Otherwise, process the update (or copy) persisted in step 12. The processing as such is the same as Recovery-Step7. Because LBA-15 already maps to OldPBA (i.e., BTT and the log agree about the mapping), no further recovery steps are required.

In some embodiments, an indication as to when to perform a BTT write or when to perform one of the modified BTT write processes may be implemented. In one embodiment, a flag in the I/O Request Packet (IRP) may be used to indicate whether unmodified BTT is allowed. In one example implementation, any write operation will be performed using unmodified BTT unless the IRP flag indicates that unmodified BTT should not be performed. If, for example, a file has a direct-mapped data section, then the file system may set the flag in the IRP indicating that a regular BTT should not be performed. In one embodiment, the stack flag in the IRP (SL_PERSISTENT_MEMORY_FIXED_MAPPING) may be implemented to indicate if a given LBA address may be remapped or not. If the flag is CLEAR, then the given LBA may be remapped and unmodified BTT may be used. In some implementations, the system may default to allow all existing drivers to use unmodified BTT by setting the flag as CLEAR. If the flag is SET, the given LBA should not be remapped and therefore unmodified BTT should not be used.

In some embodiments, an in-place BTT option may be provided. In-place BTT is desirable in cases where a single volume or disk needs to support files that require sector atomicity guarantees and files that do not. For in-place BTT write operations, the BTT table is traversed to find the PBA corresponding to an LBA. However, the same PBA is written to instead of remapping, copying, and logging. The risk of a torn sector may be acceptable to some applications that can handle the torn sector, and for applications for which changes in LBA to PBA mapping for files that are being used in the direct access mode is to be avoided. In some embodiments a flag may be implemented indicating that the LBA to PBA mapping should not be changed for performing requested I/O operation.

In some embodiments, a per write BTT scheme may be implemented, where an indication may be provided to indicate whether CBTT and in-place BTT should be allowed. In one implementation, the indication may provide tri-state information, which may be implemented in one example by two flags. The three states may include:
1. The driver can remap the PBA for the LBA, but sector atomicity for the I/O operation should be provided.
2. The driver should not remap the PBA for the LBA, and sector atomicity for the I/O need not be provided. Typically, this is expected to provide increased performance.
3. The driver should not remap the PBA for the LBA, but the driver should provide sector atomicity for the I/O operation.

In some embodiments, a per file BTT scheme may be implemented, where a file can be marked at open time or a later time, indicating that I/O operations should use one of the BTT modes discussed above.

Although non-cached I/O may be converted to cached I/O or may flow down the IO stack, cached I/O and memory mapped I/O ends up in the same place so there is no need for coherency flush and purge. Because of the additional write operation associated with CBTT, in some embodiments regular BTT may be used if the data section is torn down.

Figure 3:
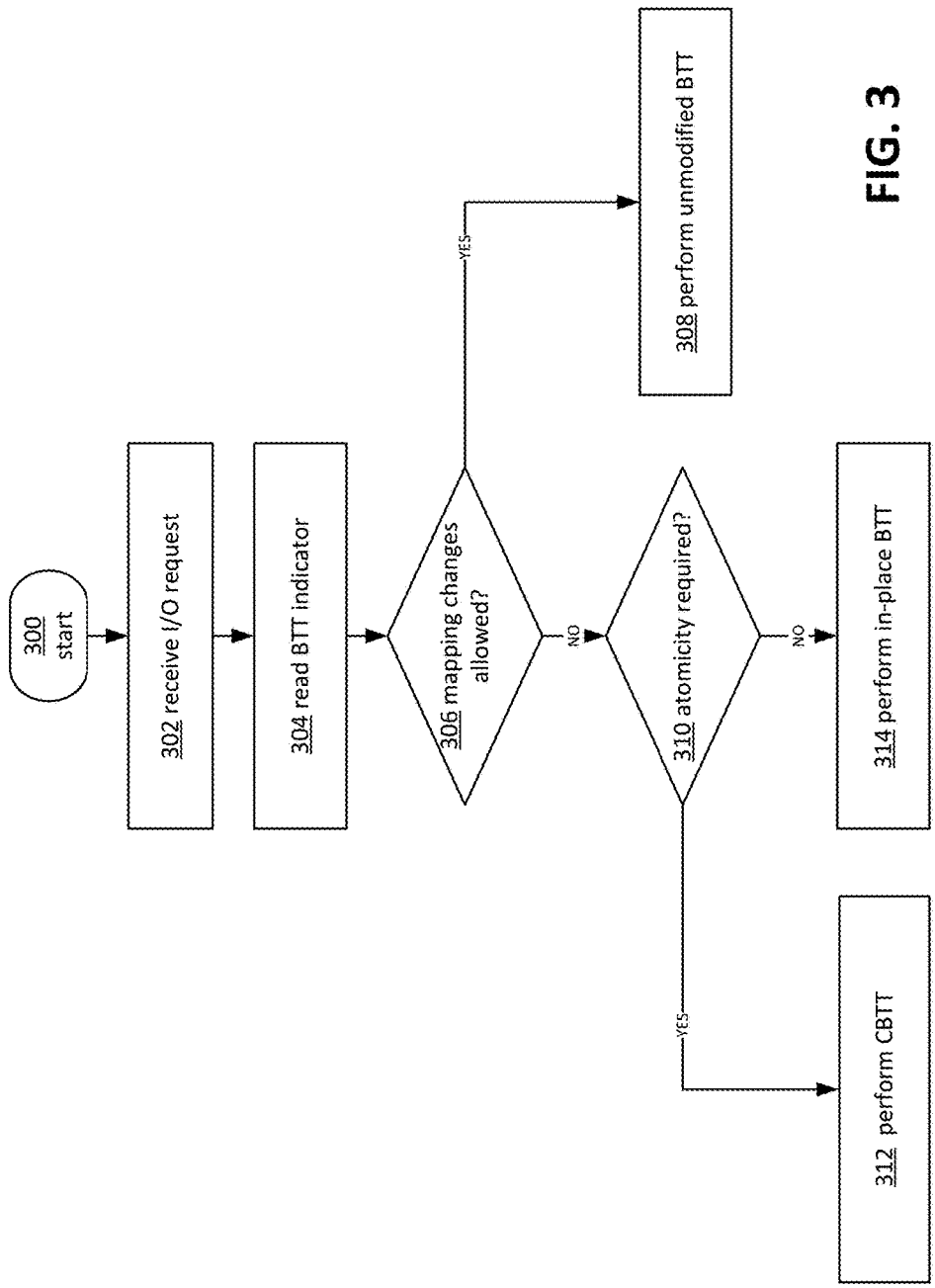
FIG. 3 depicts an example operational procedure for selecting a BTT operation.

FIG. 3 illustrates an example process for implementing I/O in a system providing memory address translation. Process 300 may begin at operation 302, where an I/O request may be received, for example, as an IRP. The request may be parsed to identify information indicating one or more flags pertaining to BTT implementation at operation 304, for example. Operation 306 may include determining whether LBA to PBA mapping changes are allowed for the write operation. If mapping changes are allowed, then operation 308 may be performed which includes performing the write operation with unmodified BTT. If mapping changes are not allowed, then operation 306 may be followed by operation 310, where it is determined whether sector atomicity is required. If atomicity is required, then operation 310 may be followed by operation 312 where the write operation may be performed using CBTT. If atomicity is not required, then operation 310 may be followed by operation 314 where the write operation may be performed with in-place BTT.

Figure 4:
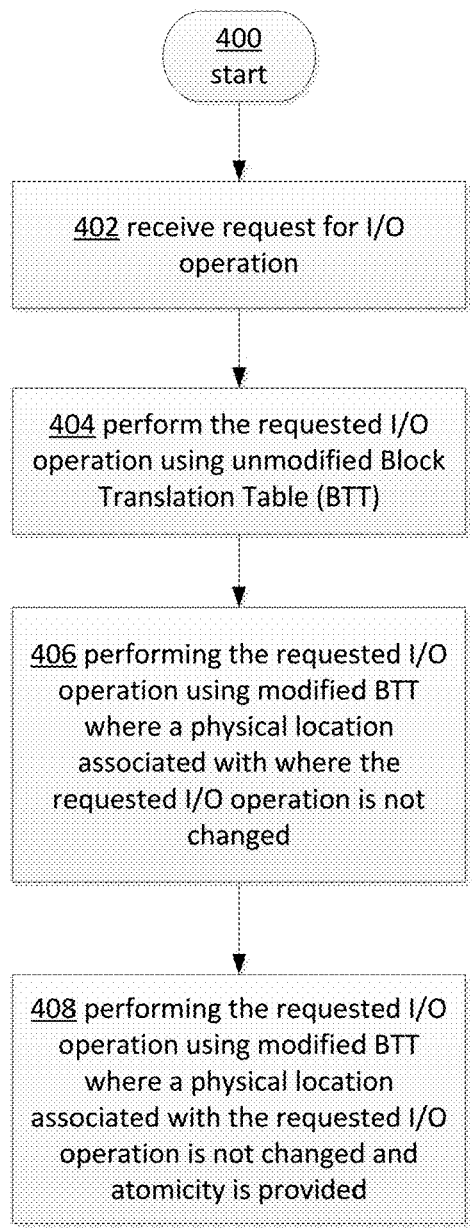
FIG. 4 depicts an example operational procedure for performing a memory operation.

FIG. 4 illustrates an example operational procedure for facilitating operation of a plurality of computing devices. In an embodiment, the procedure can be implemented at least in part in a system or function corresponding to configuration-based assessment system 500 in FIG. 5.

Referring to FIG. 4, operation 400 begins the operational procedure. Operation 400 may be followed by operation 402. Operation 402 illustrates receiving a request for an I/O operation. In an embodiment, the request may include information indicative of whether a physical memory address may be changed. The request may also include information regarding whether sector atomicity is desired. Operation 402 may be followed by operations 404, 406, or 408. Based on the information, the requested I/O operation may be performed using, as illustrated in operation 404, unmodified Block Translation Table (BTT), where the physical location associated with the requested I/O operation is changed and sector atomicity is provided. Based on the information, the requested I/O operation may alternatively be performed using, as illustrated in operation 406, modified BTT, where a physical location associated with the requested I/O operation is not changed. Based on the information, the requested I/O operation may alternatively be performed using, as illustrated in operation 408, modified BTT, where a physical location associated with the requested I/O operation is not changed and atomicity is provided.

The techniques described above may be implemented on one or more computing devices or environments, as described below. FIG. 4 depicts an example general purpose computing environment in which in which some of the techniques described herein may be embodied. The computing system environment 1002 is only one example of a suitable computing environment and is not intended to suggest any limitation as to the scope of use or functionality of the presently disclosed subject matter. Neither should the computing environment 1002 be interpreted as having any dependency or requirement relating to any one or combination of components illustrated in the example operating environment 1002. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Figure 5:
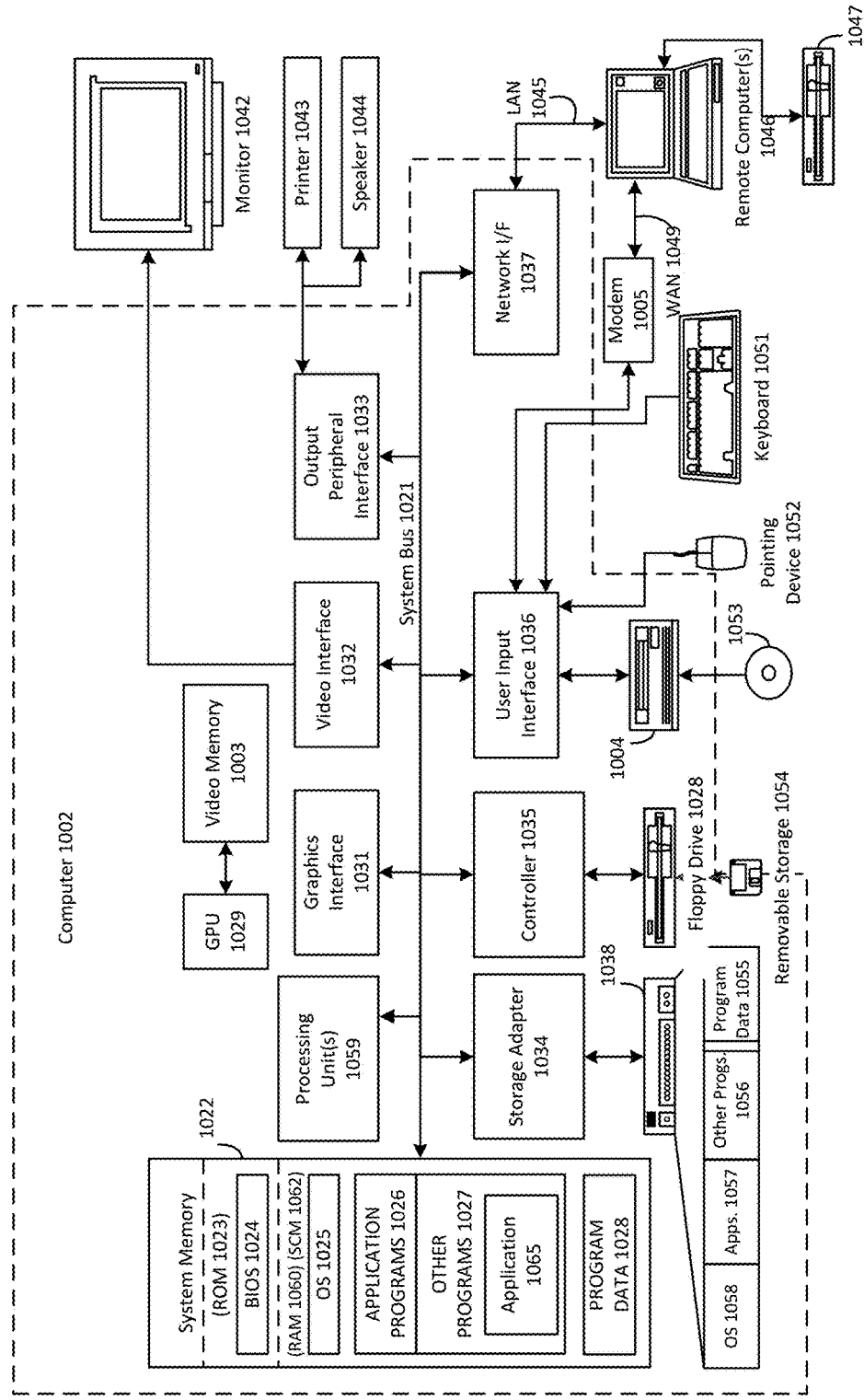
FIG. 5 depicts an example general purpose computing environment in which in which the techniques described herein may be embodied.

Computer 1002, which may include any of a mobile device or smart phone, tablet, laptop, desktop computer, etc., typically includes a variety of computer-readable media. Computer-readable media can be any available media that can be accessed by computer 1002 and includes both volatile and persistent media, removable and non-removable media. The system memory 1022 includes computer-readable storage media in the form of volatile and/or persistent memory such as read only memory (ROM) 1023 and random access memory (RAM) 160. A basic input/output system 1024 (BIOS), containing the basic routines that help to transfer information between elements within computer 1002, such as during start-up, is typically stored in ROM 1023. RAM 1060 and SCM 1062 typically contains data and/or program modules that are immediately accessible to and/or presently being operated on by processing unit 1059. By way of example, and not limitation, FIG. 5 illustrates operating system 1025, application programs 1026, other program modules 1027, and program data 1028.

The computer 1002 may also include other removable/non-removable, volatile/persistent computer storage media. By way of example only, FIG. 5 illustrates a hard disk drive 1038 that reads from or writes to non-removable, persistent magnetic media, a magnetic disk drive 1039 that reads from or writes to a removable, persistent magnetic disk 1054, and an optical disk drive 14 that reads from or writes to a removable, nonvolatile optical disk 1053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1038 is typically connected to the system bus 1021 through a storage adapter 1034, and magnetic disk drive 1039 and optical disk drive 1004 are typically connected to the system bus 1021 by a controller 1035.

The drives and their associated computer storage media discussed above and illustrated in FIG. 5, provide storage of computer-readable instructions, data structures, program modules and other data for the computer 1002. In FIG. 5, for example, hard disk drive 1038 is illustrated as storing operating system 1058, application programs 1057, other program modules 1056, and program data 1055. Note that these components can either be the same as or different from operating system 1025, application programs 1026, other program modules 1027, and program data 1028. Operating system 1058, application programs 1057, other program modules 1056, and program data 1055 are given different numbers here to illustrate that, at a minimum, they are different copies. A user may enter commands and information into the computer 1002 through input devices such as a keyboard 1051 and pointing device 1052, commonly referred to as a mouse, trackball or touch pad. Other input devices (not shown) may include a microphone, joystick, game pad, satellite dish, scanner, or the like. These and other input devices are often connected to the processing unit 1059 through a user input interface 1036 that is coupled to the system bus, but may be connected by other interface and bus structures, such as a parallel port, game port or a universal serial bus (USB). A monitor 1042 or other type of display device is also connected to the system bus 1021 via an interface, such as a video interface 1032. In addition to the monitor, computers may also include other peripheral output devices such as speakers 1044 and printer 1043, such as a 3D printer, which may be connected through a output peripheral interface 1033.

The computer 1002 may operate in a networked environment using logical connections to one or more remote computers, such as a remote computer 1046. The remote computer 1046 may be a personal computer, a server, a router, a network PC, a peer device or other common network node, and typically includes many or all of the elements described above relative to the computer 1002, although only a memory storage device 1047 has been illustrated in FIG. 5. The logical connections depicted in FIG. 5 include a local area network (LAN) 1045 and a wide area network (WAN) 1049, but may also include other networks. Such networking environments are commonplace in offices, enterprise-wide computer networks, intranets and the Internet.

When used in a LAN networking environment, the computer 1002 is connected to the LAN 1045 through a network interface or adapter 1037. When used in a WAN networking environment, the computer 1002 typically includes a modem 1005 or other means for establishing communications over the WAN 1049, such as the Internet. The modem 1005, which may be internal or external, may be connected to the system bus 1021 via the user input interface 1036, or other appropriate mechanism. In a networked environment, program modules depicted relative to the computer 1002, or portions thereof, may be stored in the remote memory storage device. Remote application programs may reside on memory device 1047. It will be appreciated that the network connections shown are example and other means of establishing a communications link between the computers may be used.

In some aspects, other programs 1027 may include an additional application 1065. In some cases, the application 1065 may provide a user interface through graphics interface 1031, video interface 1032, output peripheral interface 1033, and/or one or more monitors or touch screen devices 1042.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or persistent storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a storage class memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for performing a memory operation where direct memory access and logical address translation are implemented, the method comprising:
    receiving a request for an I/O operation, the request including information indicative of whether a physical memory address may be changed and whether sector atomicity is desired;
    when the information indicates that physical memory address may be changed and sector atomicity is desired, performing the requested I/O operation using unmodified Block Translation Table (BTT) wherein a physical location associated with the requested I/O operation is changed and sector atomicity is provided; and otherwise:
    performing modified BTT wherein the requested I/O operation is completed without changing the physical block address associated with the requested I/O operation and atomicity is provided if the request indicates that sector atomicity is desired.

2. The method of claim 1, further comprising traversing the BTT to determine the physical block address (PBA) and copying data directly to a physical memory location that corresponds to the determined PBA.

3. The method of claim 1, further comprising:
    identifying a free block and copying data to the free block; and
    writing the data to a physical memory address associated with a current physical block address.

4. The method of claim 1, wherein the request is received as an I/O Request Packet (IRP).

5. The method of claim 4, wherein a flag in the IRP is used to indicate whether unmodified BTT is allowed.

6. The method of claim 5, wherein the requested I/O operation is performed using unmodified BTT unless the IRP flag indicates that unmodified BTT should not be performed.

7. The method of claim 5, wherein a stack flag in the IRP indicates if a given LBA address may be remapped.

8. The method of claim 4, wherein a flag in the IRP is used to indicate one of three states, the three states comprising a first state indicating that a PBA can be remapped for a LBA and sector atomicity for the requested I/O operation should be provided; a second state indicating that the PBA should not be remapped for the LBA and sector atomicity for the requested I/O operation need not be provided; and a third state indicating that the PBA should not be remapped for the LBA and sector atomicity for the requested I/O operation should be provided.

9. The method of claim 1, further comprising parsing the request to identify information indicating one or more flags pertaining to BTT implementation.

10. The method of claim 1, further comprising determining whether LBA to PBA mapping changes are allowed for the requested I/O operation.

11. The method of claim 1, further comprising performing the requested I/O operation with unmodified BTT when mapping changes are allowed.

12. The method of claim 1, further comprising determining whether sector atomicity is required when mapping changes are not allowed.

13. The method of claim 1, further comprising performing the requested I/O operation using Copy BTT (CBTT) when atomicity is required.

14. The method of claim 1, further comprising performing the requested I/O operation with in-place BTT when atomicity is not required.

15. The method of claim 1, wherein a file is marked to indicate which BTT mode the requested I/O operation should use.

16. A system for efficiently performing a memory operation where direct memory access and logical address translation are implemented, the system comprising a processor and memory, the system programmed to perform the following operations:
  receiving a request for a write operation, the request including information indicative of whether a physical memory address may be changed and whether sector atomicity is desired;
  based on the information:
  performing the requested write operation using unmodified BTT if the physical memory address may be changed and sector atomicity is desired, wherein the physical memory address associated with the requested write operation is changed and sector atomicity is provided; and otherwise:
  performing modified BTT wherein the requested write operation is completed without changing the physical memory address associated with the requested write operation and, if sector atomicity is desired, providing atomicity.

17. The system of claim 16, the system programmed to perform the following operation: traversing the BTT to determine a physical block address and copying data directly to a physical memory address that corresponds to the determined physical block address.

18. The system of claim 16, the system programmed to perform the following operations:
  identifying a free block and copying data to the free block; and
  writing the data to a physical memory address associated with a current physical block address.

19. The system of claim 16, wherein the request is received as an I/O Request Packet (IRP) and the IRP packet indicates whether unmodified BTT is allowed.

20. The system of claim 16, further comprising parsing the request to identify information indicating one or more flags pertaining to BTT implementation.

21. The system of claim 16, further comprising determining whether LBA to PBA mapping changes are allowed for the requested write operation.

22. A computer readable storage medium having stored thereon instructions that, upon execution by at least one processor, cause the at least one processor to perform operations for efficiently performing a memory operation where direct memory access and logical address translation are implemented, the operations comprising:
  receiving a request for a I/O operation, the request including information indicative of whether a physical memory address may be changed and whether sector atomicity is desired;
  based on the information, performing the requested I/O operation using unmodified BTT wherein the physical memory address associated with the requested I/O operation is changed and sector atomicity is provided if the information so indicates; and
  otherwise, performing modified BTT wherein the requested I/O operation is completed without changing a physical location associated with the requested I/O operation, wherein atomicity is provided if the information indicates that sector atomicity is desired.

* * * * *